United States Patent [19]

Deguchi et al.

[11] Patent Number: 5,463,421
[45] Date of Patent: Oct. 31, 1995

[54] SOLID-STATE IMAGE APPARATUS WHICH SWEEPS OUT INDEPENDENTLY INEFFECTIVE ELECTRIC CHARGES SO THAT THE EXPOSURE PERIOD CAN BE VARIED WITHIN A RANGE FROM ONE FIELD PERIOD TO ONE FRAME PERIOD

[75] Inventors: Hiroaki Deguchi; Masahiro Yamashita; Yukihiro Masuda, all of Kanagawa, Japan

[73] Assignee: Sony Corporation, Tokyo, Japan

[21] Appl. No.: 67,284

[22] Filed: May 26, 1993

[30] Foreign Application Priority Data

May 30, 1992 [JP] Japan ................................. 4-163792
May 30, 1992 [JP] Japan ................................. 4-164046

[51] Int. Cl.$^6$ .................................................. H04N 5/335
[52] U.S. Cl. .......................... 348/296; 348/297; 348/322
[58] Field of Search ................................. 348/294, 296, 348/311, 319, 320, 321, 322, 323, 297, 241; H04N 5/335

[56] References Cited

U.S. PATENT DOCUMENTS 5,027,218  6/1991  Ueda ........................................ 348/219
5,194,957  3/1993  Kyuma ..................................... 348/296

FOREIGN PATENT DOCUMENTS

0265925  5/1988  European Pat. Off. .
0346905  12/1989  European Pat. Off. .

Primary Examiner—Joseph Mancuso
Assistant Examiner—Tuan V. Ho
Attorney, Agent, or Firm—William S. Frommer; Alvin Sinderbrand

[57] ABSTRACT

There is disclosed a solid-state image pick-up apparatus provide with a solid-state image sensor such as a CCD image sensor, etc. This solid-state image pick-up apparatus comprises; a solid-state image sensor comprised of a plurality of photosensitive elements arranged in a form of a matrix having rows and columns, and responsive to a light incident thereonto to accumulate electric charges; a plurality of vertical shift registers coupled to the respective columns of the matrix of the photosensitive elements, and adapted for receiving electric charges from the photosensitive elements in response to a sensor gate signal; a storage section coupled to the vertical shift registers, and adapted for receiving electric charges from the vertical shift registers in response to a first transfer signal; a horizontal shift register coupled to the storage means, and adapted for receiving electric charges from the storage means in response to a second transfer signal for outputting, column by column, electric charges from the solid-state image sensor; and a timing signal generator for sweeping out independently ineffective electric charges accumulated in the photosensitive elements of the odd rows and those accumulated in the photosensitive elements of the even rows so that the accumulating period of effective electric charges is adjustably varied in a range from one field period to one frame period.

6 Claims, 5 Drawing Sheets

SOLID-STATE IMAGE APPARATUS WHICH SWEEPS OUT INDEPENDENTLY INEFFECTIVE ELECTRIC CHARGES SO THAT THE EXPOSURE PERIOD CAN BE VARIED WITHIN A RANGE FROM ONE FIELD PERIOD TO ONE FRAME PERIOD

BACKGROUND OF THE INVENTION

1. Field of the Invention

This invention relates to a solid-state image pick-up apparatus using a solid-state image sensor such as a CCD image sensor, etc. formed by CCDs (Charge Coupled Devices), and more particularly to a solid-state image pick-up apparatus provided with a solid-state image sensor of the frame interline transfer type, which is adapted to transfer, to a storage section through vertical transfer registers, image pick-up charges obtained by photosensitive elements of the odd rows and photosensitive elements of the even rows arranged in a matrix form, which constitute an image sensing (image pick-up) section, thus to line-sequentially output those image pickup charges through a horizontal transfer register from the storage section.

2. Description of the Prior Art

Figure 5:
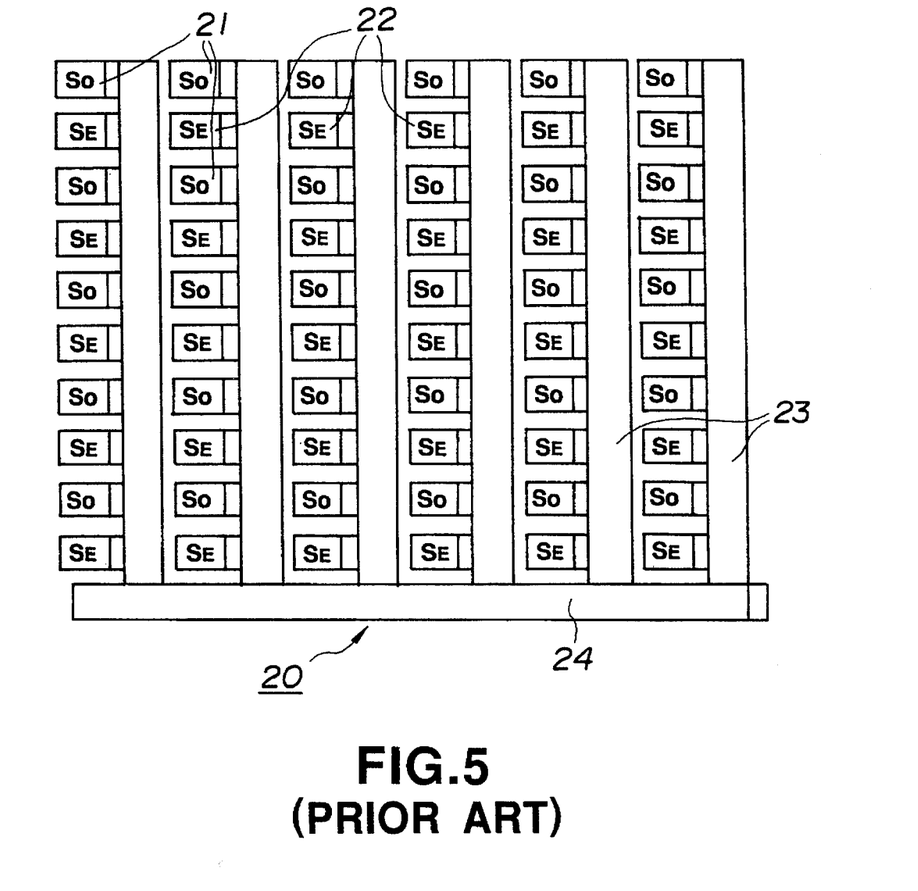
FIG. 5 is a view showing the configuration of a conventional solid-state image pick-up apparatus.

Generally, in a solid-state image sensor having a discrete pixel structure where a plurality of photosensitive elements are arranged in a matrix form, in order to cope with the interlaced scanning system employed in an ordinary television system, photosensitive elements 21 of the odd rows and photosensitive elements 22 of the even rows are alternately arranged in a vertical direction in respective columns of the matrix as shown in FIG. 5, for example, thus to line-sequentially output image pickup charges obtained in the frame storage mode or the field storage mode.

Figure 6:
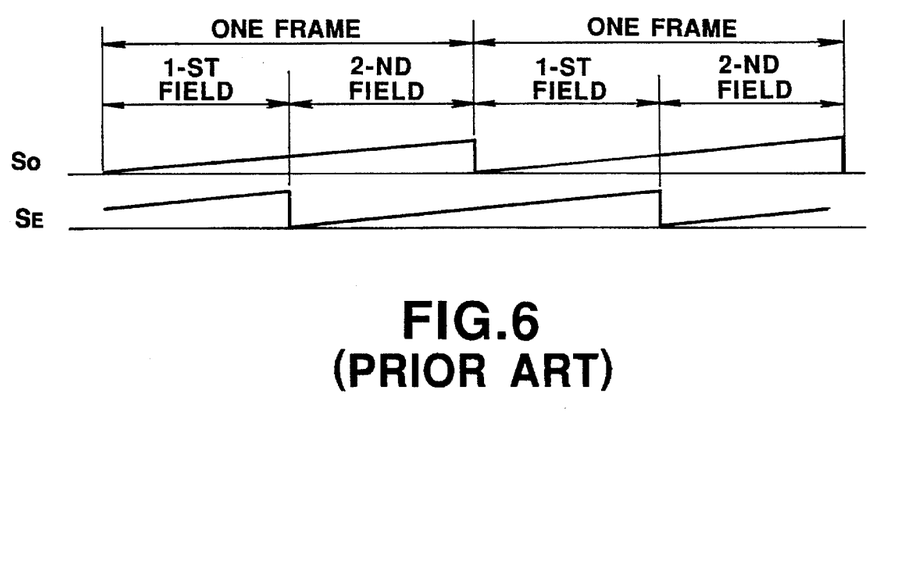
FIG. 6 is an explanatory view showing the image pick-up operation in an ordinary frame accumulating mode.
Figure 7:
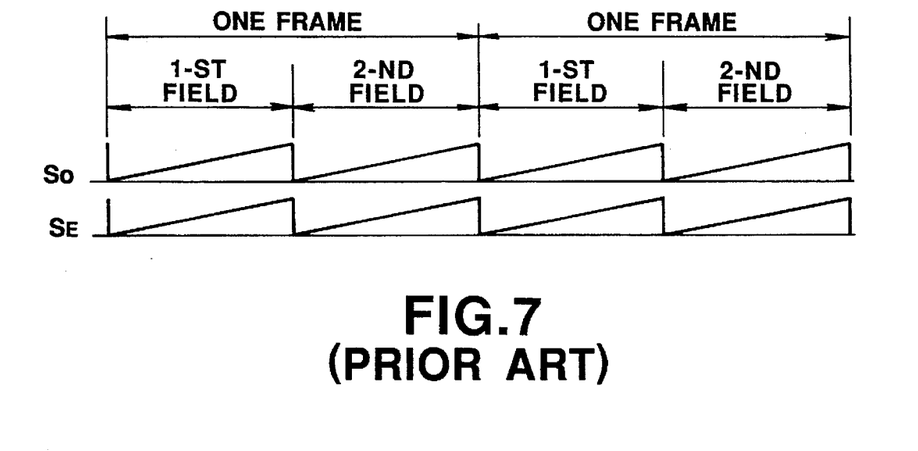
FIG. 7 is an explanatory view showing the image pick-up operation in an ordinary field accumulating mode.

In the above-mentioned frame storage (accumulating) mode, as shown in FIG. 6, image pick-up charges $S_O$, $S_E$ are respectively accumulated within every one frame period in the states shifted to each other by one field period by photosensitive elements 21, 22 of the odd and even rows corresponding to pixels of respective fields to interchangeably read out, to vertical transfer registers 23 every field during a vertical blanking period, image pick-up charges $S_O$ by the photosensitive elements 21 of the odd rows and image pick-up charges $S_E$ by the photosensitive elements 22 of the even rows shown in FIG. 5 to line-sequentially output those image pick-up charges through a horizontal transfer register 24. On the other hand, in the field storage (accumulating) mode, as shown in FIG. 7, image pick-up charges $S_O$, $S_E$ are respectively accumulated within every one field period by photosensitive elements 21, 22 of the odd and even rows corresponding to pixels of respective fields to read out, to the respective vertical transfer registers 23, image pick-up charges $S_O$ by the photosensitive elements 21 of the odd rows and image pick-up charges $S_E$ by the photosensitive elements 22 of the even rows in the state where combinations of image pick-up charges by photosensitive elements adjacent in upper and lower directions are changed so that respective image pick-up charges are mixed every field during a vertical blanking period to line-sequentially output them through the horizontal transfer register 24.

Namely, a solid-state image sensor operative in the frame accumulating mode carries out an image pick-up operation such that one frame period, i.e., 1/30 seconds in the case of the NTSC system (1/25 seconds in the case of the PAL system) is used as an exposure period (shutter speed). On the other hand, a solid-state image sensor operative in the field accumulating mode carries out an image pick-up operation such that one field period, i.e., 1/60 seconds in the case of the NTSC system (1/50 seconds in the case of the PAL system) is used as the exposure period (shutter speed).

The solid-state image sensor 20 shown in FIG. 5 is of the structure to line-sequentially output image pick-up charges obtained by the photosensitive elements 21, 22 through the horizontal transfer register 24 from the vertical transfer registers 23, and is known as an interline transfer type solid-state image sensor. Further, there have been conventionally known as the solid-state image sensor, in addition to the above-mentioned interline transfer type solid-state image sensor, a frame transfer type CCD image sensor in which e.g., vertical transfer registers by CCDs are provided at the portions of the photosensitive elements, and a storage (accumulating) section comprised of vertical transfer registers by CCDs is provided on the terminating side of the above-mentioned vertical transfer registers, thus to line-sequentially output image pick-up charges through the horizontal transfer register from the storage (accumulating) section; a frame interline transfer type solid-state image sensor provided with a storage (accumulating) section between the vertical transfer registers and the horizontal transfer register in the above-mentioned interline transfer type solid-state image sensor, and the like.

Further, in a solid-state image sensor such as a CCD image sensor, etc., there has been conventionally known an electronic shutter function to sweep out image pick-up charges produced in the photosensitive elements into, e.g., an overflow drain to thereby control the effective charge accumulating period (exposure period). The above-mentioned electronic shutter function is realized by controlling an overflow drain potential by a voltage (shutter pulse) applied to the substrate.

Meanwhile, in a conventional solid-state image pick-up apparatus using a CCD image sensor having an electric function, in the case where an attempt is made to control the exposure period by the above-mentioned electronic shutter, there are the problems described below. Namely, in a solid-state image sensor operative in the field accumulating mode, the exposure period can be controlled only within one field period in principle. On the other hand, even in a solid-state image sensor operative in the frame accumulating mode, image pick-up charges $S_O$, $S_E$ obtained by photosensitive elements corresponding to pixels of the first field and photosensitive elements of the even rows corresponding to pixels of the second field are both swept out into the overflow drain by applying a shutter pulse to the substrate. For this reason, even in the case of such solid-state image sensor operative in the frame accumulating mode, there was the problem that the exposure period is only permitted to be controlled solely within one field period.

SUMMARY OF THE INVENTION

With the above in view, an object of this invention is to provide a solid-state image pick-up apparatus constructed to permit the exposure period to be adjustably varied within a range from one field period to one frame period when controlling that exposure period by the electronic shutter function, thus making it possible to realize an image pick-up operation of a wide adjustable control range of the exposure period.

To achieve the above-mentioned object, in accordance with this invention, there is provided a solid-state image pick-up apparatus, comprising; a solid-state image sensor comprised of a plurality of photosensitive elements arranged in a form of a matrix having rows and columns, and responsive to a light incident thereon to accumulate electric charges; a plurality of vertical shift registers coupled to the respective columns of the matrix of the photosensitive elements, and adapted for receiving electric charges from the photosensitive elements in response to a sensor gate signal; storage means coupled to the vertical shift registers, and adapted for receiving electric charges from the vertical shift registers in response to a first transfer signal; a horizontal shift register coupled to the storage means, and adapted for receiving electric charges from the storage means in response to a second transfer signal for outputting, column by column, electric charges from the solid-state image sensor; and means for sweeping out independently ineffective electric charges accumulated in the photosensitive elements of the odd rows and those accumulated in the photosensitive elements of the even rows so that the accumulating period of effective electric charges is adjustably varied in a range from one frame period to one field period.

In a more specific form of this invention, there is provided a solid-state image pickup apparatus, comprising; a solid-state image sensor comprised of a plurality of photosensitive elements arranged in a form of a matrix having rows and columns, and responsive to a light incident thereon to accumulate electric charges; a plurality of vertical shift registers coupled to the respective columns of the matrix of the photosensitive elements, the respective vertical shift registers being adapted for receiving electric charges from the photosensitive elements of the odd rows in response to a first sensor gate signal, and adapted for receiving electric charges from the photosensitive elements of the even rows in response to a second sensor gate signal; storage means coupled to the vertical shift registers, and adapted for receiving electric charges from the vertical shift registers in response to a first transfer signal, a horizontal shift register coupled to the storage means, and adapted for receiving electric charges from the storage means in response to a second transfer signal for outputting, column by column, electric charges from the solid-state image sensor; means for delivering the first sensor gate signal to the solid-state image sensor so that electric charges accumulated in the photosensitive elements of the odd rows are transferred to the vertical shift registers; the first sensor gate signal being delivered to the solid-state image sensor twice within one frame period, i.e., at a first timing during a vertical blanking period before an imaging period of the first field and at a second timing different from the first timing, effective charges being transferred to the vertical shift registers at the first timing, and ineffective charges being transferred to the vertical shift registers at the second timing; means for delivering the second sensor gate signal to the solid-state image sensor so that electric charges accumulated in the photosensitive elements of the even rows are transferred to the vertical shift registers; said second sensor gate signal being delivered to the solid-state image sensor twice within one frame period, i.e., at a third timing during a vertical blanking period before an imaging period of the second field and at a fourth timing different from the third timing, effective charges being transferred to the vertical shift registers at the third timing, and ineffective charges being transferred to the vertical shift registers at the fourth timing; and means for delivering a vertical transfer signal for transferring the electric charges in the vertical shift registers to the storage means, and for transferring the electric charges in the storage means to the horizontal shift register, the vertical transfer signal being provided rapidly twice within every vertical blanking period, ineffective charges being transferred from the vertical shift registers to the storage means by the first rapid vertical transfer signal, and the ineffective charges being read out through the horizontal shift register from the storage means, effective charges being transferred from the vertical shift registers to the storage means by the second rapid vertical transfer signal, and the effective charges being read out through the horizontal shift register for an imaging period subsequent thereto.

A solid-state image pick-up apparatus may further comprise: means for controlling a maximum charge quantity which can be accumulated in the respective photosensitive elements of the solid-state image sensor.

A solid-state image pick-up apparatus may further comprise: means for varying the second timing of the first sensor gate signal and the fourth timing of the second sensor gate signal, thus allowing the accumulating time of effective charges to be adjustably varied in a range from one field period to one frame period.

In another more specific form of this invention, there is provided a solid-state image pick-up apparatus, comprising: a solid-state image sensor comprised of a plurality of photosensitive elements arranged in a form of a matrix having rows and columns, and responsive to a light incident thereonto to accumulate electric charges; a plurality of vertical shift registers coupled to the respective columns of the matrix of the photosensitive elements, the vertical shift registers being adapted for receiving electric charges from the photosensitive elements of the odd rows in response to a first sensor gate signal, and for receiving electric charges from the photosensitive elements of the even rows in response to a second sensor gate signal; storage means coupled to the vertical shift registers, and adapted for receiving electric charges from the vertical shift registers in response to a first transfer signal; a horizontal shift register coupled to the storage means, and adapted for receiving electric charges from the storage means in response to a second transfer signal for outputting, column by column, electric charges from the solid-state image sensor; a drain region responsive to a shutter signal to sweep out all of the electric charges accumulated in the photosensitive elements; means for delivering the shutter signal once every field; ineffective charges accumulated in the photosensitive elements of the odd rows being swept out into the drain region by the shutter signal delivered in the first field, and ineffective charges accumulated in the photosensitive elements of the even rows being swept out into the drain region by the shutter signal delivered in the second field; means for delivering the first sensor gate signal to the solid-state image sensor so that electric charges accumulated in the photosensitive elements of the odd rows are transferred to the vertical shift registers; the first sensor gate signal being delivered to the solid-state image sensor twice within one frame period, i.e., at a first timing during a vertical blanking period before an imaging period of the first field, and at a second timing immediately before the shutter signal of the second field, and effective charges which have been read out at the first timing and effective charges which have been read out at the second timing being added in the vertical shift registers, the second sensor gate signal being delivered to the solid-state image sensor twice within one frame period, i.e., at a third timing during a vertical blanking period before an imaging period of the second field and at a fourth timing immediately before the shutter signal of the first field, and effective charges which have been read out at the third timing and effective charges which have been read out at the forth timing being added in the vertical shift registers, the respective additive readout operations of effective charges being carried out so that the accumulating time of effective charges is adjustably varied in a range from one field period from one frame period.

In accordance with the solid-state image pick-up apparatus thus constituted, the exposure period is permitted to be adjustably varied within a range from one field period to one frame period when controlling that exposure period. Thus, an image pick-up operation of a wide adjustable control range of the exposure period is provided. In addition, when this apparatus further comprises means for controlling a maximum charge quantity which can be accumulated in the respective photosensitive elements of the solid-state image sensor, ineffective charges generated in these photosensitive elements are satisfactorily prevented from overflowing in the horizontal transfer register, thus making it possible to provide an image pick-up output of a good picture quality.

DESCRIPTION OF THE PREFERRED EMBODIMENTS

Preferred embodiments of a solid-state image pick-up apparatus according to this invention will now be described with reference to the attached drawings.

Figure 1:
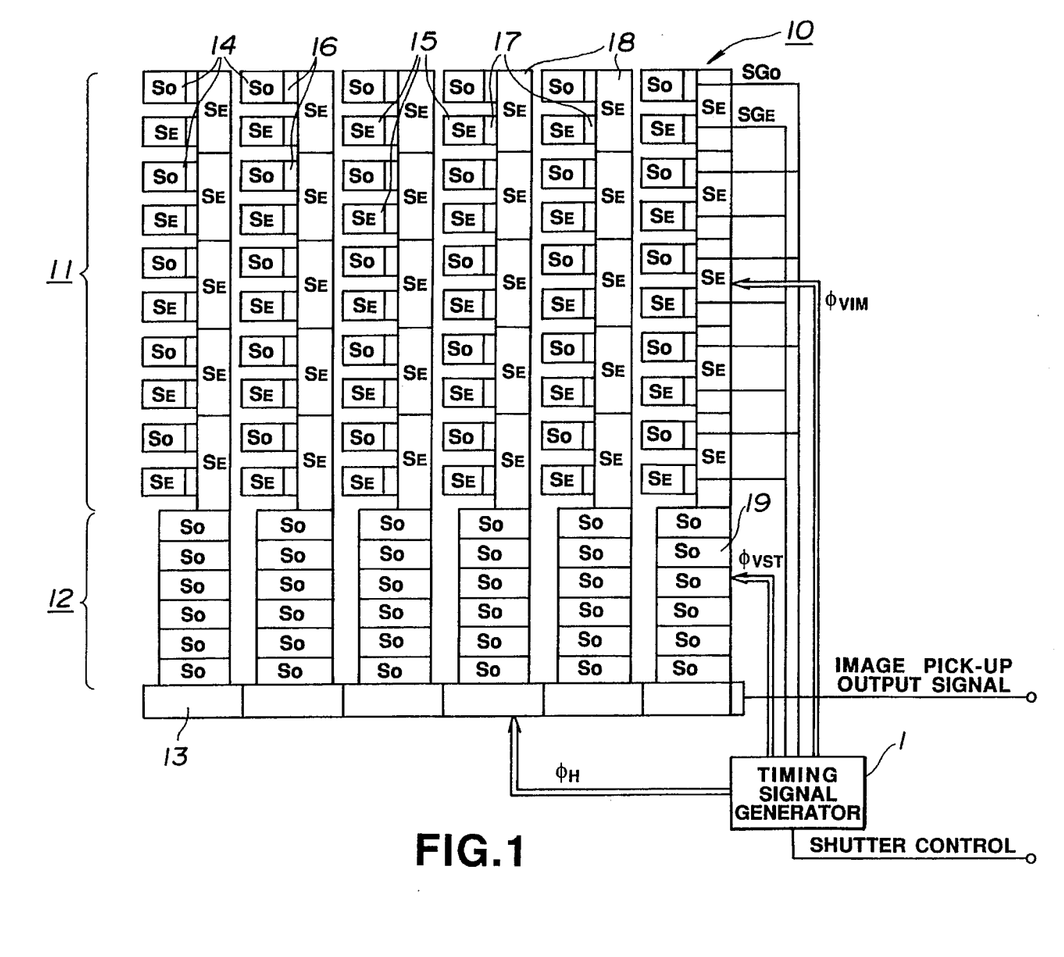
FIG. 1 is a view showing the configuration of a solid-state image pick-up apparatus according to a first embodiment of this invention.

A solid-state image pick-up apparatus according to a first embodiment of this invention is constituted as shown in FIG. 1, for example.

The solid-state image pick-up apparatus shown in FIG. 1 includes a CCD image sensor 10 driven by various timing signals generated by a timing signal generator 1.

The solid-state image sensor 10 is comprised of a plurality of photosensitive elements 14, 15 arranged in a form of a matrix of rows and columns, and responsive to a light incident thereonto to accumulate electric charges. More particularly, the photosensitive elements 14 are elements of the odd rows corresponding to pixels of the first field, and the photosensitive elements 15 are elements of the even rows corresponding to pixels of the second field. Sensor gates 18 are respectively provided in association with the photosensitive elements 14, and sensor gates 17 are respectively provided in association with the photosensitive elements 15.

The solid-state image pick-up apparatus further comprises a plurality of vertical transfer registers 18 having the number of transfer stages corresponding to the number scanning lines of one field. In this embodiment, an image pick-up section 11 is constituted by the photosensitive elements 14, 15 constituting the CCD image sensor 10 and the vertical transfer registers 18. More particularly, these vertical transfer registers 18 are coupled to the respective columns of the matrix of the photosensitive elements 14, 15, and adapted for receiving electric charges from the photosensitive elements 14, 15 in response to sensor gate pulses which will be described later. The solid-state image pick-up apparatus further comprises a storage section 12, which are comprised of vertical transfer registers 19, coupled to the vertical transfer registers 18, and adapted for receiving electric charges from the vertical transfer registers 18 in response to a first transfer signal which will be described later; a horizontal shift register 13 coupled to the storage section, and adapted for receiving electric charges from the storage section in response to a second transfer signal for outputting, column by column, electric charges, and a timing signal generator 1 for generating various timing signals. Additionally, the horizontal shift register 13 has the number of transfer stages corresponding to the number of pixels of one line.

Figure 2:
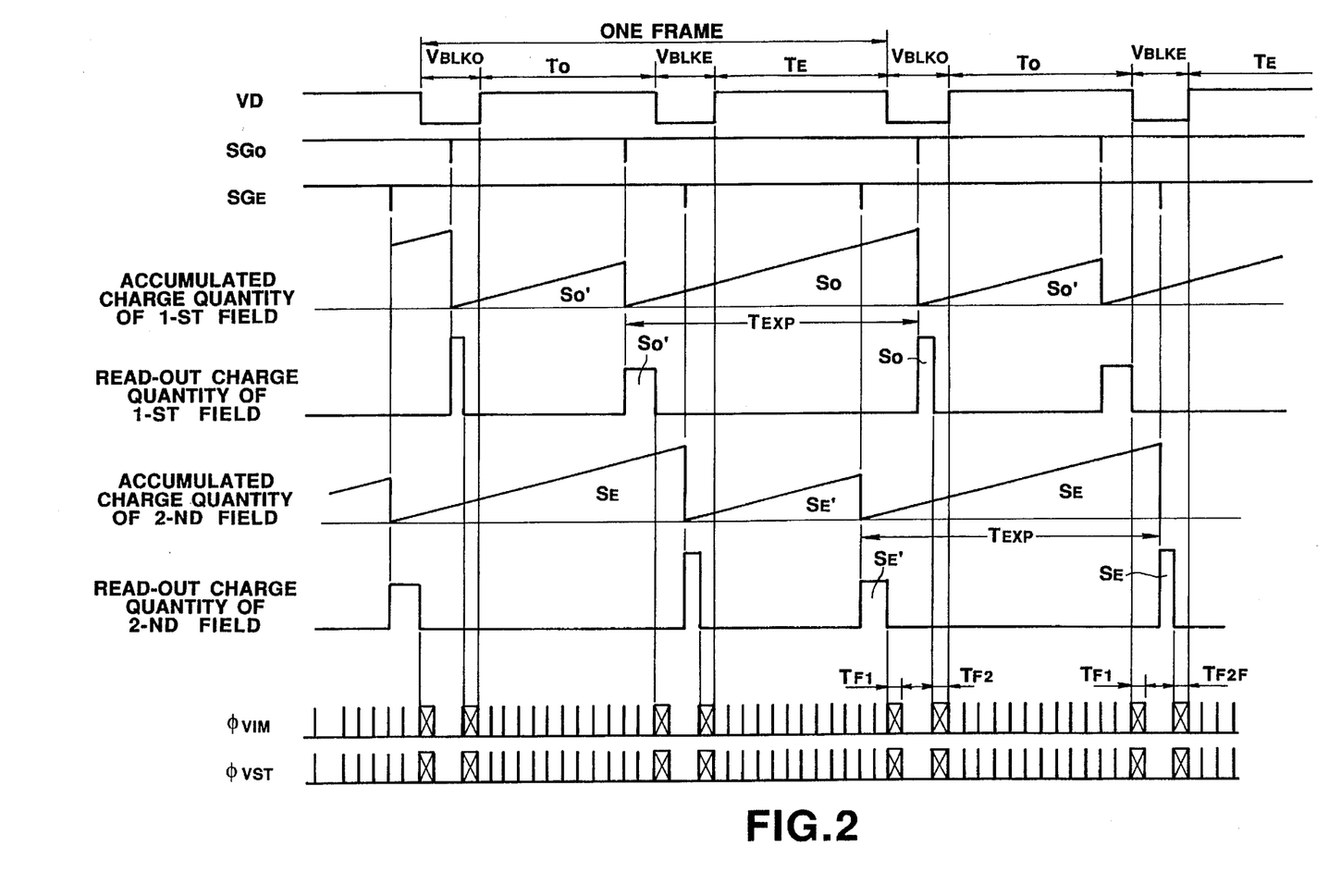
FIG. 2 is a timing chart showing the operation of the solid-state image pick-up apparatus shown in FIG. 1.

More particularly, the timing signal generator 1 generates, as shown in FIG. 2, various timing signals such as first and second sensor gate pulses $SG_O$, $SG_E$ for opening respective sensor gates 16, 17 of the CCD image sensor 10, a vertical transfer clock pulse $\phi_{VIM}$ for driving the vertical transfer registers 18 of the image pick-up section 10, a vertical transfer clock pulse $\phi_{VST}$ for driving the vertical transfer registers 19 of the storage section 12, and a horizontal transfer clock pulse $\phi H$ (not shown in FIG. 2) for driving the horizontal transfer register 13, etc.

The first sensor gate pulse $SG_O$ for opening the sensor gates 16 of the odd rows is generated during a vertical blanking period $V_{BLKO}$ immediately before an imaging period every one frame period during which image pick-up charges $S_O$ obtained by the photosensitive elements 14 of the odd rows corresponding to pixels of the first field are to be read out, and is generated at a timing earlier by a desired exposure period $T_{EXP}$ from the above-mentioned timing. Further, the second sensor gate pulse $SG_E$ for opening the sensor gates 17 of the even rows is generated during a vertical blanking period $V_{BLKE}$ immediately before an imaging period every one frame period during which image pick-up charges $S_E$ obtained by the photosensitive elements 15 of the even rows corresponding to pixels of the second field are to be read out, and is generated at a timing earlier by a desired exposure period $T_{EXP}$ from the above-mentioned timing. Namely, the above-mentioned first and second gate pulses $SG_O$, $SG_E$ are respectively produced twice during one frame period.

The vertical transfer clock pulse $\phi_{VIM}$ for driving the vertical transfer registers 18 of the image pick-up section 11 and the vertical transfer clock pulse $\phi_{VST}$ for driving the vertical transfer registers 19 of the storage section 12 are generated synchronously with each other. As shown in FIG. 2, for effective imaging periods $T_O$, $T_E$, these vertical transfer clock pulses are generated every horizontal scanning period (1H) corresponding to the pixel pitch in a vertical direction of the CCD image sensor 10 and are outputted as high speed transfer pulses for respective high speed transfer periods $T_{F1}$, $T_{F2}$ provided before and after the timings of first and second sensor gate pulses $SG_O$, $SG_E$ during vertical blanking periods $V_{BLKO}$, $V_{BLKE}$ every one field.

Further, the horizontal transfer clock pulse $\phi_H$ for driving the horizontal transfer register 13 is generated every repetitive period corresponding to the pixel pitch in a horizontal direction of the CCD image sensor 10.

Thus, the CCD image sensor 10 is driven as follows by various timing signals such as the first and second sensor gate pulses $SG_O$, $SG_E$, the vertical transfer clock pulses $\phi_{VIM}$, $\phi_{VST}$, and horizontal transfer clock pulse $\phi_H$, etc. as described above generated by the timing signal generator 1.

First, at a vertical blanking period $V_{BLKO}$ of one field of the first half of one frame, image pick-up charges $S_O$ of the photosensitive elements 14 of odd rows accumulated for the former one frame period are read out into the vertical transfer registers 18 of the image pick-up section 11.

The vertical transfer registers 18 of the image pick-up section 11 and the vertical transfer registers 19 of the storage section 12 are driven at a high speed by the vertical transfer clock pulses $\phi_{VIM}$, $\phi_{VST}$ outputted as a high speed transfer pulse from the timing signal generator 1 during the high speed transfer period $T_{F1}$ of the first half of the vertical blanking period $V_{BLKO}$, whereby ineffective charges remaining in the vertical transfer registers 18 of the image pick-up section 11 are swept out. Thus, the vertical transfer registers 18 of the image pick-up section 11 are placed in an empty state.

The sensor gates 16 of the odd rows are opened by the first sensor gate pulse $SG_O$ generated immediately after the high speed transfer period $T_{F1}$. Thus, image pick-up charges $S_O$ in the photosensitive elements 14 of the odd rows accumulated for the former one frame period are read out into the vertical transfer registers 18 of the image pick-up section 11. Namely, image pick-up charges $S_O$ in the photosensitive elements 14 of the odd rows are read out into the vertical transfer registers 18 of the image pick-up section 11 by the first opening operation of the sensor gates 18 of the odd rows.

The image pick-up charges $S_O$ in the photosensitive elements of the odd rows which have been read into the vertical transfer registers 18 of the image pick-up section 11 are transferred at a high speed from the vertical transfer registers 18 of the image pick-up section 11 to the vertical transfer registers 19 of the storage section 12 as the result of the fact that the vertical transfer registers 18 of the image pick-up section 11 and the vertical transfer registers 19 of the storage section 12 are driven at a high speed by the vertical transfer clock pulses $\phi_{VIM}$, $\phi_{VST}$ outputted as a high speed transfer pulse from the timing signal generator 1.

The image pick-up charges $S_O$ in the photosensitive elements of the odd rows which have been transferred at a high speed to the vertical transfer registers 19 of the storage section 12 are transferred in a vertical direction by one horizontal scanning line as the result of the fact that the vertical transfer registers 18 of the image pick-up section 11 and the vertical transfer registers 19 of the storage section 12 are driven at a high speed by the vertical transfer clock pulses $\phi_{VIM}$, $\phi_{VST}$ of one horizontal scanning period during which an imaging period $T_O$ subsequent to the vertical blanking period $V_{BLKO}$, and those image pick-up changes $S_O$ are line-sequentially read out through the horizontal transfer register 13 driven by the horizontal transfer clock pulse $\phi_H$.

Here, the photosensitive elements 14 of the odd rows where image pick-up charges $S_O$ are read out by the first opening operation of the sensor gates 16 of the odd rows and are placed into an empty state carry out accumulation (storage) of image pick-up charges $S_O{}'$ until the sensor gates 16 of the odd rows are subsequently opened. These image pick-up charges $S_O{}'$ are read out from the photosensitive elements 14 of the odd rows to the vertical transfer registers 18 of the image pick-up section 11 by the second opening operation of the sensor gates of the odd rows. The image pick-up charges $S_O{}'$ which have been read out into the vertical transfer registers 18 of the image pick-up section 11 are swept out by high speed transfer as ineffective charges during the high speed transfer period $T_{F1}$ of the vertical blanking period after the timing of the sensor gate pulse $SG_O$ allowing the sensor gates 16 of the odd rows to be opened as a second opening operation.

The photosensitive elements 14 of the odd rows which have been empty as the result of the fact that the image pick-up charges $S_O{}'$ are read out by the second opening operation of the sensor gates 16 of the odd rows carry out accumulation (storage) of these image pick-up charges $S_O$ with a period until the sensor gates 16 of the odd rows are opened in the subsequent frame being as an effective charge storage period $T_{EXP}$. The image pick-up charges $S_O$ accumulated or stored in the sensor gates 16 of the odd rows during the effective charge storage period $T_{EXP}$ are read out into the vertical transfer registers 18 of the image pick-up section 11 during the vertical blanking period $V_{BLKO}$ of one field of the first half of the subsequent frame, and are line-sequentially read out through the horizontal transfer register 13 during an imaging period $T_O$ subsequent to the vertical blanking period $V_{BLKO}$.

Then, during a vertical blanking period $V_{BLKE}$ of one field of the latter half of one frame, image pick-up charges $S_E$ of the photosensitive elements 15 of the even rows which have been accumulated or stored for the former one frame period are read out into the vertical transfer registers 18 of the image pick-up section 11.

Namely, by the vertical transfer clock pulses $\phi_{VIM}$, $\phi_{VST}$ outputted as a high speed transfer pulse from the timing signal generator 1 during the high speed transfer period $T_{F1}$ of the first half of the vertical blanking period $V_{BLKE}$, the vertical transfer registers 18 of the image pick-up section 11 and the vertical transfer registers 19 of the storage section 12 are driven at a high speed. As a result, ineffective charges remaining in the vertical transfer registers 18 of the image pick-up section 11 are swept out. Thus, the vertical transfer registers 18 of the CCD image sensor 11 are placed in an empty state.

Then, sensor gates 17 of the even rows are opened by the second sensor gate pulse $SG_E$ generated immediately after the high speed transfer period $T_{F1}$. As a result, the image pick-up charges $S_E$ of photosensitive elements 15 of the even rows which have accumulated or stored for the former one frame period are read out into the vertical transfer registers 18 of the image pick-up section 11. Namely, the image pick-up charges $S_E$ in the photosensitive elements 15 of the even rows are read out into the vertical transfer registers 18 of the image pick-up section 11 by the first opening operation of the sensor gates 17 of the even rows.

The image pick-up charges $S_E$ of the second field which have been read out into the vertical transfer registers 18 of the image pick-up section 11 are transferred at a high speed from the vertical transfer registers 18 of the image pick-up section 11 to the vertical transfer registers 19 of the storage section 12 as the result of the fact that the vertical transfer registers 18 of the image pick-up section 11 and the vertical transfer registers 19 of the storage section 12 are driven at a high speed by the vertical transfer clock pulses $\phi_{VIM}$, $\phi_{VST}$ outputted as a high speed transfer pulse from the timing generator 1.

The image pick-up charges $S_E$ of the second field which have been transferred to the vertical transfer registers 19 of the storage section 12 are transferred in a vertical direction by one horizontal scanning line as the result of the fact that the vertical transfer registers 18 of the image pick-up section 11 and the vertical transfer registers 19 of the storage section 12 are driven by the respective transfer clock pulses $\phi_{VIM}$, $\phi_{VST}$ of one horizontal scanning period during an imaging period $T_E$ subsequent to the vertical blanking period $V_{BLKE}$, and are line-sequentially read out through the horizontal transfer register 13 driven by the horizontal transfer clock pulse $\phi_H$.

Here, the photosensitive elements 14 of the odd rows which have been empty as the result of the fact that image pick-up charges $S_E$ are read out by the first opening operation of the sensor gates 17 of the even rows carry out accumulation or storage of image pick-up charges $S_E'$ until the sensor gates 17 of the even rows are opened subsequently. Then, these image pick-up charges $S_E'$ are read out from the photosensitive elements 15 of the even rows into the vertical transfer registers 18 of the image pick-up section 11 by the second opening operation of the sensor gates 17 of the even rows. The image pick-up charges $S_E'$ which have been read out into the vertical transfer registers 18 of the image pick-up section 11 are swept out as ineffective charges by high speed transfer during the high speed transfer period $T_{F1}$ of the vertical blanking period after the timing of the sensor gate pulse $SG_E$ of the second field allowing the sensor gates 17 of the even rows to be opened as a second opening operation.

It is to be noted that since these ineffective charges are read out during the vertical blanking period, they are to be removed by the subsequent signal processing.

The photosensitive elements 15 of the even rows which have been empty as the result of the fact that image pick-up charges $S_E'$ are read out by the second opening operation of the sensor gates 17 of the even rows carry out accumulation or storage of image pick-up charges $S_E$ with a time period until the sensor gates of the even rows are opened in the subsequent frame being as an effective charge storage period $T_{EXP}$. The image pick-up charges $S_E$ which have been accumulated or stored in the sensor gates 17 of the even rows during the effective charge storage period $T_{EXP}$ are read out into the vertical transfer registers 18 of the image pick-up section 11 during the vertical blanking period $V_{BLKE}$ of one field of the latter half of the subsequent frame, and are line-sequentially read out through the horizontal transfer register 13 during an imaging period $T_E$ subsequent to the vertical blanking period $V_{BLKE}$.

As stated above, an approach is employed to drive the frame interline transfer type CCD image sensor by various timing signals generated by the timing signal generator 1, thereby making it possible to read out interchangeably, every field, image pick-up charges $S_O$ of the first field and image pick-up charges $S_E$ of the second field accumulated or stored during the effective charge storage period $T_{EXP}$ thus to provide an image pick-up output obtained as the result of the fact that the image pick-up operation has been carried out by the interlaced scanning. Further, since the effective charge storage period $T_{EXP}$ of respective fields is determined as a time period from the second generation timing of respective sensor gate pulses $SG_O$, $SG_E$ to the first generation timing of the subsequent frame, which are generated twice within one frame by the timing generator 1, as described above, the second generation timing is controlled, thereby permitting the effective charge storage period to be variable within one frame period.

Particularly, an approach is employed to adjustably control the second generation timings of respective sensor gate pulses $SG_O$, $SG_E$ within a first one field period during one frame period, thereby permitting the effective charge storage period $T_{EXP}$ to be adjustably varied within a range from one field period to one frame period.

Explanation will now be given in connection with a circuit for controlling a maximum charge quantity which can be accumulated in respective photosensitive elements of a CCD image sensor as shown in FIG. 1, for example.

Figure 3:
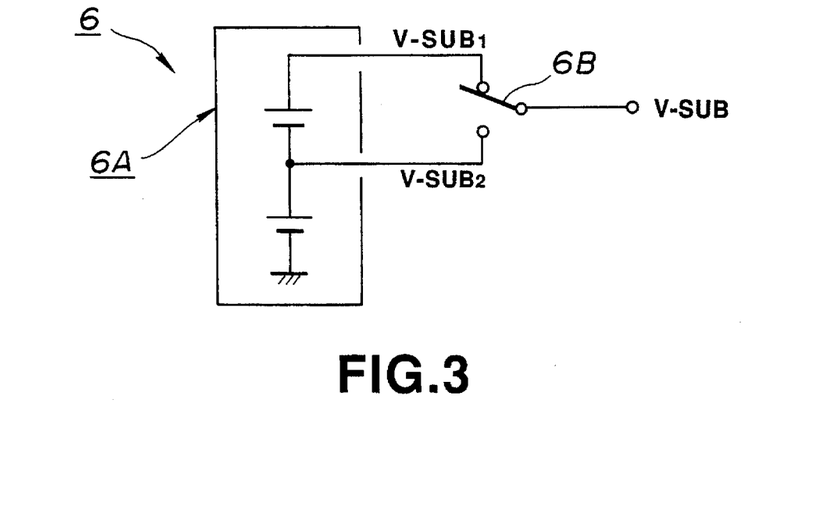
FIG. 3 is a circuit diagram showing a circuit for controlling a maximum charge quantity which can be accumulated in respective photosensitive elements of a solid-stage image sensor.

Such a CCD drive circuit 6 is constructed as shown in FIG. 3. Namely, this CCD drive circuit 6 is adapted to selectively output two kinds of voltages V-SUB$_1$, V-SUB$_2$ generated by a voltage generation source 6A through a selector switch 6B to apply the selected one to the substrate of the CCD image sensor. The selector switch 6B switches a voltage V-SUB applied to the substrate of the CCD image sensor in dependency upon a control signal given by a control unit (e.g., timing signal generator 1 in FIG. 1) to vary an overflow drain potential for determining a maximum storage charge quantity $Q_{MAX}$ of respective photosensitive elements 14, 15 of the CCD image sensor. In the CCD image sensor, the values of respective voltages V-SUB$_1$, V-SUB$_2$ are set as follows. Namely, setting is made such that a maximum storage charge quantity $Q_{MAX2}$ of respective photosensitive elements 14, 15 in the case where the voltage V-SUB$_2$ is applied to the substrate is smaller than the maximum storage charge quantity $Q_{MAX1}$ of respective photosensitive elements 14, 15 in the case where the voltage V-SUB$_1$ is applied to the substrate.

In this operation mode, image pick-up charges $S_O'$ of the photosensitive elements 14 of the odd rows and image pick-up charges $S_E'$ of photosensitive elements 15 of the even rows which have been read out into the vertical transfer registers 18 of the image pick-up section 11 by applying, to the image pick-up section 11, sensor gate pulses $SG_O$, $SG_E$ interchangeably every field during imaging periods of respective fields are swept out as ineffective charges. Accordingly, a large quantity of unnecessary charges are produced. In view of this, an approach is employed in this embodiment such that during high speed transfer period, the horizontal transfer pulse $\phi_H$ is caused to be a high speed pulse, thereby allowing the vertical transfer registers 18 to sweep out ineffective charges by high speed transfer through the horizontal transfer register 13. In this operation mode, a large unity of unnecessary charges are produced as described above, but such large quantity of unnecessary charges can be swept out through the horizontal transfer register 13 by the high speed transfer. Namely, even if the horizontal transfer register 13 has a small charge transfer quantity every transfer operation, it can sweep out a large quantity of ineffective charges by employing the high speed transfer to increase the number of transfer operations. In addition, the voltage V-SUB$_2$ is applied to the substrate as described above to allow the maximum storage charge quantity of respective photosensitive elements 14, 15 to be set to a smaller maximum storage charge quantity $Q_{MAX2}$, thereby making it possible to reduce a quantity of ineffective charges produced. Thus, ineffective charges produced in the photosensitive elements 14, 15 when a light having an excessive light quantity is incident are prevented from overflowing in the horizontal transfer register 13, thus making it possible to provide an image output of a satisfactory picture quality.

It is to be noted while, in the above-described embodiment, switching between voltages V-SUB$_1$ and V-SUB$_2$ applied to the substrate of the CCD image sensor 10 is carried out to switch the maximum charge storage quantity of respective photosensitive elements 14, 15 from $Q_{MAX1}$ to $Q_{MAX2}$, an approach may be employed to continuously carry out variable control of a voltage V-SUB applied to the substrate of the CCD image sensor 10, thereby making it possible to continuously vary the maximum charge storage quantity of respective photosensitive elements 14, 15.

A second embodiment of this invention will now be described with reference to FIG. 4.

Figure 4:
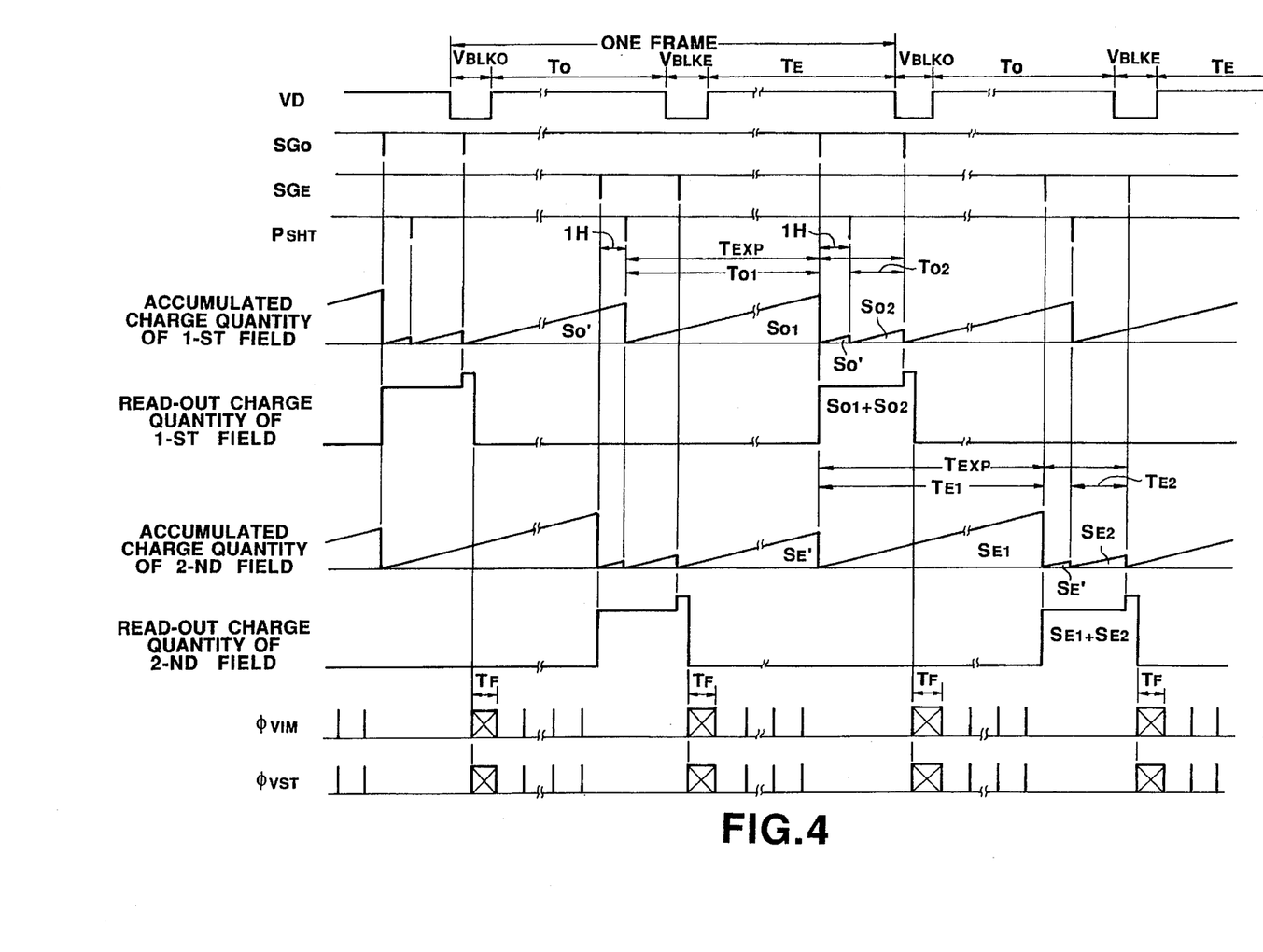
FIG. 4 is a timing chart showing the operation of solid-state image pick-up apparatus according to a second embodiment of this invention.

The timing signal generator 1 generates, as shown in FIG. 4, various timing signals such as a shutter pulse $P_{SHT}$ for control of an electronic shutter applied to the substrate of the CCD image sensor 10, first and second sensor gate pulses $SG_O$, $SG_E$ for opening respective sensor gates 16, 17 of the CCD image sensor 10, a vertical transfer clock pulse $\phi_{VIM}$ for driving the vertical transfer registers 18 of the image pick-up section 11, a vertical transfer clock pulse $\phi_{VST}$ for driving the vertical transfer registers 19 of the storage section 12, and a horizontal transfer clock pulse $\phi_H$ for driving the horizontal transfer register 13, etc.

The first sensor gate pulse $SG_O$ for opening the sensor gates 16 of the odd rows is generated during a vertical blanking period $V_{BLKO}$ immediately before an imaging period every one frame where image pick-up charges $S_O$ obtained by photosensitive elements 14 of the odd rows are to be read out, and is generated at the timing earlier by one horizontal scanning period (1H) of the shutter pulse $P_{SHT}$ for control of an electronic shutter of the second field. Further, the second sensor gate pulses $SG_E$ for opening the sensor gates 17 of the even rows is generated during a vertical blanking period immediately before an imaging period every one frame period where image pick-up charges $S_E$ obtained by photosensitive elements 14 of the odd rows are to be read out, and is generated at the timing earlier by one horizontal scanning period (1H) of the shutter pulse $P_{SHT}$ for controlling an electronic shutter of the first field. Namely, the above-mentioned first and second sensor gate pulses $SG_O$, $SG_E$ are respectively generated twice during one frame period.

Further, the shutter pulse $P_{SHT}$ for control of an electronic shutter of the first field is generated within a range from one field period to one frame period before the first sensor gate pulse $SG_O$ during the vertical blanking period $V_{BLKO}$. Moreover, the shutter pulse $P_{SHT}$ for control of an electronic shutter of the second field is generated within a range from one field period to one frame period before the second sensor gate pulse $SG_E$ during the vertical blanking period $V_{BLKE}$.

Further, the vertical transfer clock pulse $\phi_{VIM}$ for driving the vertical transfer registers 18 of the image pick-up section 11 and the vertical transfer clock pulse $\phi_{VST}$ for driving the vertical transfer registers 19 of the storage section 12 are generated in a manner synchronous with each other. These pulses are generated, as shown in FIG. 4, every horizontal scanning period (1H) corresponding to the pixel pitch in a vertical direction of the CCD image sensor 10, and are outputted as a high speed transfer pulse during a high speed transfer period $T_F$ provided immediately after the timings of the first and second sensor gate pulses $SG_O$, $SG_E$ during vertical blanking periods $V_{BLKO}$, $V_{BLKE}$ every one field.

Furthermore, the horizontal transfer clock pulse $\phi_H$ for driving the horizontal transfer register 13 is generated every repetitive period corresponding to the pixel pitch in a horizontal direction of the CCD image sensor 10.

In addition, the CCD image sensor 10 is driven as follows by various timing signals such as shutter pulse $P_{SHT}$, first and second sensor gate pulses $SG_O$, $SG_E$, vertical transfer clock pulses $\phi_{VIM}$, $\phi_{VST}$, and horizontal transfer clock pulse $\phi_H$, etc. as described above generated by the timing signal generator 1.

Namely, image pick-up charges $S_O$, $S_E$ generated by respective photosensitive elements 14, 15 of the CCD image sensor 10 are all swept out into an overflow drain (provided adjacently to or below respective photosensitive elements, although not shown) every time the shutter pulse $P_{SHT}$ is applied to the substrate.

The image pick-up charges $S_O$ obtained by the photosensitive elements 14 of the odd rows are read out into the vertical transfer registers 18 every time the sensor gates 16 of the odd rows are opened by the sensor gate pulse $SG_O$. Further, the image pick-up charges $S_E$ obtained by the photosensitive elements 15 of the even rows are read out into the vertical transfer registers 18 every time the sensor gates 17 of the even rows are opened by the second sensor gate pulse $SG_E$.

The photosensitive elements 14 of the odd rows carry out accumulation or storage of image pick-up charges $S_{O1}$ within a time period $T_{O1}$ of about one field from the time when image pick-up charges $S_O$ are swept out into the overflow drain by the shutter pulse $P_{SHT}$ for control of an electronic shutter of the first field. The charges $S_{O1}$ accumulated or stored for this time period $T_{O1}$ are read out into the vertical transfer registers 18 by the first sensor gate pulse $SG_O$ earlier by one horizontal scanning period of the shutter pulse $P_{SHT}$ for control of an electronic shutter of the second field. Further, the photosensitive elements 14 of the odd rows accumulate or store image pick-up charges $S_{O2}$ within a time period $T_{O2}$ from the time point when those image pick-up charges are swept out into the overflow drain by the shutter pulse $P_{SHT}$ for control of an electronic shutter of the second field to the timing of the sensor gate pulse $SG_O$ of the first field for the vertical blanking period $V_{BLKO}$.

It is to be noted that the reason why image pick-up charges $S_{O1}$ are read out at the time point earlier by one horizontal scanning period of the electronic shutter pulse $P_{SHT}$ of the second field is to prevent those image pick-up charges from being swept out into the overflow drain by the electronic shutter pulse $P_{SHT}$ of the second field. Further, the reason why those image pick-up charges are read out at the time point earlier by one horizontal scanning period of the electronic shutter pulse $P_{SHT}$ of the second field is to avoid the bad influence exerted on a video signal by an electric shutter pulse. Namely, respective pulses are delivered during a horizontal blanking period.

Image pick-up charges accumulated or stored for one horizontal scanning period between $T_{O1}$ and $T_{O2}$ are swept out into the overflow drain by the shutter pulse $P_{SHT}$ for a vertical blanking period $V_{BLKE}$. The image pick-up charges $S_{O2}$ for the time period $T_{O2}$ are read out into the vertical registers by the sensor gate pulse $SG_O$ for the vertical blanking period $V_{BLKE}$.

Thus, respective image pick-up charges $S_{O1}$, $S_{O2}$ accumulated or stored for the time periods $T_{O1}$, $T_{O2}$ are added, and those added image pick-up charges are read out into the vertical transfer registers 18. Namely, image pick-up charges $S_{O1}+S_{O2}$ having $T_{O1}+T_{O2}$ as the effective charge storage period $T_{EXP}$ are read out into the vertical transfer registers 18.

Here, an approach is employed to control the timing of the shutter pulse $P_{SHT}$ for control of an electronic shutter of the first field, thereby making it possible to vary the storage time of the photosensitive elements 14 of the odd rows corresponding to pixels of the first field in a range from one field period to one frame period.

The image pick-up charges $S_{O1}+S_{O2}$ which have been read out into the vertical transfer registers 18 are transferred at a high speed from the vertical transfer registers 18 of the image pick-up section 11 into the vertical transfer registers 19 of the storage section 12 for a high speed transfer period $T_F$ provided immediately after the timing of the first sensor gate pulse $SG_O$ during a vertical blanking period $V_{BLKO}$.

During an imaging period $T_O$ subsequent to the vertical blanking period $T_{BLKO}$, the vertical transfer registers 18 of the image pick-up section 11 and the vertical transfer registers 19 of the storage section 12 are driven by respective vertical transfer clock pulses $\phi_{VIM}$, $\phi_{VST}$ of one horizontal scanning period are driven, whereby image pick-up charges $S_O$ of the first field in the vertical transfer registers 19 of the storage section 12 are transferred in a vertical direction. Thus, those image pick-up charges are outputted by one horizontal scanning line, i.e., line-sequentially through the horizontal transfer register 13 driven by the horizontal transfer clock pulse $\phi_H$.

Further, the photosensitive elements 15 of the even rows accumulate or store image pick-up charges $S_{E1}$ for the time period $T_{E1}$ of about one field after those image pick-up charges $S_E'$ are swept out into the overflow drain by the shutter pulse $P_{SHT}$ for control of an electronic shutter of the second field. Then, the image pick-up charges $S_{E1}$ for this time period $T_{E1}$ are read out into the vertical transfer registers 18 by the first sensor gate pulse $SG_E$ earlier by one horizontal scanning period of the shutter pulse $P_{SHT}$ for control of an electronic shutter of the first field. In addition, photosensitive elements 15 of the even rows accumulate or store image pick-up charges $S_{O2}$ for a time period $T_{E2}$ from the time point when those image pick-up charges are swept out into the overflow drain by the shutter pulse $P_{SHT}$ for control of an electronic shutter of the first field to the timing of the sensor gate pulse $SG_E$ of the second field for the vertical blanking period $V_{BLKE}$.

The image pick-up charges accumulated or stored for one horizontal scanning period between $T_{E1}$ and $T_{E2}$ are swept out into the overflow drain by the shutter pulse $P_{SHT}$ for the vertical blanking period $V_{BLKE}$. Thus, image pick-up charges $S_{E2}$ for time period $T_{E2}$ are read out into the vertical registers by the sensor gate pulse $SG_E$ during the vertical blanking period $V_{BLKE}$.

Thus, respective image pick-up charges $S_{E1}$, $S_{E2}$ accumulated or stored for the periods $T_{E1}$, $T_{E2}$ are added and those added image pick-up charges are read out into the vertical transfer registers 18. Namely, the image pick-up charges $S_{E1}+S_{E2}$ with $T_{E1}+T_{E2}$ as the effective charge storage period $T_{EXP}$ are read out into the vertical transfer registers 18.

The image pick-up charges $S_{E1}+S_{E2}$ which have been read out into the vertical transfer registers 18 are transferred at a high speed from the vertical transfer registers 18 of the image pick-up section 11 to the vertical transfer registers 19 of the storage section 12 for a high speed transfer period $T_F$ provided immediately after the timing of the second sensor gate pulse $SG_E$ during the vertical blanking period $V_{BLKE}$.

During an imaging period $T_E$ subsequent to the vertical blanking period $V_{BLKE}$, the vertical transfer registers 18 of the image pick-up section 11 and the vertical transfer registers 19 of the storage section 12 are driven by the respective vertical transfer clock pulses $\phi_{VIM}$, $\phi_{VST}$, whereby image pick-up charges $S_E$ of the second field in the vertical transfer registers 19 of the storage section 12 are transferred in a vertical direction. Thus, those image pick-up charges are outputted by one horizontal scanning line, i.e., line-sequentially through the horizontal transfer register 13 driven by the horizontal transfer clock pulse $\phi_H$.

In this way, it is possible to read out, from the CCD image sensor 10, interchangeably every field, image pick-up charges $S_{O1}+S_{O2}/S_{E1}+S_{E2}$ under the state where the effective charge storage period $T_{EXP}$ is set in a range from one field period to one frame period. Thus, the exposure period is controlled within a range from one field period to one frame period by the electronic shutter function, thus making it possible to provide an image pick-up output obtained as the result of the fact that an image pick-up operation has been carried out by the interlaced scanning.

What is claimed is:

1. A solid-state image pick-up apparatus, comprising:

a solid-state image sensor comprised of a plurality of photosensitive elements arranged in a form of a matrix having rows and columns, and responsive to a light incident thereon to accumulate electric charges;

a plurality of vertical shift registers coupled to the respective columns of said matrix of said photosensitive elements, said respective vertical shift registers being adapted for receiving electrical charges from said photosensitive elements of odd rows in response to a first sensor gate signal, and adapted for receiving electric charges from said photosensitive elements of even rows in response to a second sensor gate signal;

storage means coupled to said vertical shift registers, and adapted for receiving electric charges from said vertical shift registers in response to a first transfer signal;

a horizontal shift register coupled to said storage means, and adapted for receiving electric charges from said storage means in response to a second transfer signal for outputting, column by column, charges from said solid-state image sensor;

moans for generating said first sensor gate signal having a first and second timing during a frame period;

means for sweeping out ineffective electric charges at said second timing, within said frame period, of said first sensor gate signal from said photosensitive elements of said odd rows;

means for generating said second sensor gate signal having a first and second timing, different from the first and second timing of said first sensor gate signal, during a frame period; and means for sweeping out ineffective electric charges at said second timing, within said frame period, of said second sensor gate signal from said photosensitive elements of said even rows, so that the accumulating period of effective electric charges for the odd and even rows is adjustably varied within a range from one field period to one frame period.

2. A solid-state image pick-up apparatus, comprising:

a solid-state image sensor comprised of a plurality of photosensitive elements arranged in a form of a matrix having rows and columns, and responsive to a light incident thereon to accumulate electric charges;

a plurality of vertical shift registers coupled to the respective columns of said matrix of said photosensitive elements, said respective vertical shift registers being adapted for receiving electric charges from the photosensitive elements of the odd rows in response to a first sensor gate signal, and adapted for receiving electric charges from the photosensitive elements of the even rows in response to a second sensor gate signal;

storage means coupled to said vertical shift registers, and adapted for receiving electric charges from said vertical shift registers in response to a first transfer signal;

a horizontal shift register coupled to said storage means, and adapted for receiving electric charges from said storage means in response to a second transfer signal for outputting, column by column, electric charges from said solid-state image sensor;

means for delivering said first sensor gate signal to said solid-state image sensor so that electric charges accumulated in said photosensitive elements of the odd rows are transferred to said vertical shift registers, said first sensor gate signal being delivered to said solid-state image sensor twice within one frame period, at a first timing during a vertical blanking period before an imaging period of the first field and at a second timing different from said first timing, effective charges being transferred to said vertical shift registers at said first timing, and ineffective charges being transferred to said vertical shift registers at said second timing;

means for delivering said second sensor gate signal to said solid-state image sensor so that electric charges accumulated in said photosensitive elements of the even rows are transferred to said vertical shift registers, said second sensor gate signal being delivered to said solid-state sensor twice within one frame period, at a third timing during a vertical blanking period before an imaging period of the second field and a fourth timing different from said third timing, effective charges being transferred to said vertical shift registers at said third timing, and ineffective charges being transferred to said vertical shift registers at said fourth timing; and means for delivering a vertical transfer signal for transferring the electric charges in said vertical shift registers to said storage means, and for transferring the electric charges in said storage means to said horizontal shift register, said vertical transfer signal being provided rapidly twice within every vertical blanking period, ineffective charges being transferred from said vertical shift registers to said storage means by the first rapid vertical transfer signal, and said ineffective charges being read out through said horizontal shift register from said storage means, effective charges being transferred from said vertical shift registers to said storage means by the second rapid vertical transfer signal, and said effective charges being read out through said horizontal shift register for an imaging period subsequent thereto.

3. A solid-state image pick-up apparatus as set forth in claim 2, further comprising:

means for controlling a maximum charge quantity which can be accumulated in said respective photosensitive elements of said solid-state image sensor.

4. A solid-state image pick-up apparatus as set forth in claim 2, further comprising:

means for varying the second timing of said first sensor gate signal and the fourth timing of said second sensor gate signal, thus allowing the accumulating time of effective charges to be adjustably varied with a range from one field period to one frame period.

5. A solid-state image pick-up apparatus, comprising:

a solid-state image sensor comprised of a plurality of photosensitive elements arranged in a form of a matrix having rows and columns, and responsive to a light incident thereon to accumulate electric charges;

a plurality of vertical shift registers coupled to the respective columns of said matrix of said photosensitive elements, said vertical shift registers being adapted for receiving electric charges from the photosensitive elements of the odd rows in response to a first sensor gate signal, and for receiving electric charges from the photosensitive elements of the even rows in response to a second sensor gate signal;

storage means coupled to said vertical shift registers, and adapted for receiving electric charges from said vertical shift registers in response to a first transfer signal;

a horizontal shift register coupled to said storage means, and adapted for receiving electric charges from said storage means in response to a second transfer signal for outputting, column by column, electric charges from said solid-state image sensor;

a drain region responsive to a shutter signal to sweep out all of the electric charges accumulated in said photosensitive elements;

means for delivering said shutter signal once every field;

ineffective charges accumulated in the photosensitive elements of the odd rows being swept out into said drain region by the shutter signal delivered in the first field, and ineffective charges accumulated in the photosensitive elements of the even rows being swept out into said drain region by the shutter signal delivered in the second field;

means for delivering said first sensor gate signal to said solid-state image sensor so that electric charges accumulated in the photosensitive elements of the odd rows are transferred to said vertical shift registers, said first sensor gate signal being delivered to said solid-state image sensor twice within one frame period, at a first timing during a vertical blanking period before an imaging period of the first field, and at a second timing immediately before said shutter signal of the second field, and effective charges which have been read out at said first timing and effective charges which have been read out at said second timing being added in said vertical shift registers;

said second sensor gate signal being delivered to said solid-state image sensor twice within one frame period, at a third timing during a vertical blanking period before an imaging period of the second field and at a fourth timing immediately before said shutter signal of the first filed, and effective charges which have been read out at said third timing and effective charges which have been read out at said fourth timing being added in said vertical shift registers; and said respective additive readout operations of effective charges being carried out so that the accumulating time of effective charges is adjustably varied within a range from one field period to one frame period.

6. A solid-state image pick-up apparatus, comprising:

a solid-state image sensor comprised of a plurality of photosensitive elements arranged in a form of a matrix having rows and columns, and responsive to a light incident thereon to accumulate electric charges;

A plurality of vertical shift registers coupled to the respective columns of said matrix of said photosensitive elements, and adapted for receiving electric charges from said photosensitive elements in response to a sensor gate signal;

storage means coupled to said vertical shift registers, and adapted for receiving electric charges from said vertical shift registers in response to a first transfer signal;

a horizontal shift register coupled to said storage means, and adapted for receiving electric charges from said storage means in response to a second transfer signal for outputting, column by column, charges from said solid-state image sensor;

a drain region responsive to a shutter signal to sweep out all of the electric charges accumulated in said photosensitive elements; and means for delivering said shutter signal once every field, such that ineffective charges accumulated in the photosensitive elements of odd rows are swept out into said drain region by the shutter signal delivered in the first field, and ineffective charges accumulated in the photosensitive elements of even rows are swept out into said drain region by the shutter signal delivered in the second field, so that the period of accumulating effective electric charges is adjustably varied within a range from one field period to one frame period.

* * * * *